United States Patent [19]
DeCloux

[11] Patent Number: 4,477,072
[45] Date of Patent: Oct. 16, 1984

[54] BIMODAL EXERCISE DEVICE

[76] Inventor: Richard J. DeCloux, 1485 Belmont St., Manchester, N.H. 03104

[21] Appl. No.: 421,853

[22] Filed: Sep. 23, 1982

[51] Int. Cl.³ .............................................. A63B 69/00
[52] U.S. Cl. ...................................... 272/73; 272/132; 74/365
[58] Field of Search ................. 272/73, 132; 74/337.5, 74/365

[56] References Cited
U.S. PATENT DOCUMENTS

| | | | |
|---|---|---|---|
| 3,704,886 | 12/1972 | Kay | 272/73 |
| 3,751,033 | 8/1973 | Rosenthal | 272/73 |
| 3,865,366 | 2/1975 | Stantial | 272/73 |
| 4,265,447 | 5/1981 | Shafer | 272/73 |

Primary Examiner—Richard C. Pinkham
Assistant Examiner—Leo P. Picard
Attorney, Agent, or Firm—Weingarten, Schurgin, Gagnebin & Hayes

[57] ABSTRACT

Apparatus that simulates the exercise obtained in either of two modes of bicycling, e.g. sit-down, normal pedalling; and stand-up, hill climbing pedalling. Two different systems are disclosed, both yielding the desired bimodal choice of exercise. One system includes the use of clutches and gearing that allows switching between the normal 180° fixed pedal relationship and a relationship that assists each pedal through bottom and top dead center, with the unweighted pedal being returned by the force generated by the other pedal as this other pedal is moved through the most powerful portion of the pedalling cycle. The second system includes the use of locking ratchets, adjustable spring returns, and adjustable stops to allow switching between the normal 180° fixed pedal relationship and a relationship that avoids passage of the pedals through top and bottom dead center and confines all pedal movement to the power portion of the pedalling cycle. In both systems the "down" pedal is effectively braked or stopped to provide a step-up platform to provide for body lifting in the "stand-up" mode.

20 Claims, 18 Drawing Figures

Stationary Cycling
(Using a screw-down resistance)

POINT VALUE

| TIME (MIN:SEC) | 15 MPH/ 55 RPM | 17½MPH/ 65 RPM | 20 MPH/ 75 RPM | 25 MPH/ 90 RPM | 30 MPH/ 105 RPM |
|---|---|---|---|---|---|
| 3:00 | ---- | ---- | ---- | ---- | 1 |
| 4:00 | 1/2 | ---- | 1 | ---- | ---- |
| 5:00 | ---- | ---- | 1 1/4 | 2 | 2 1/2 |
| 6:00 | 3/4 | ---- | 1 1/2 | 2 1/8 | 2 3/4 |
| 7:00 | ---- | 1 | 1 3/4 | 2 1/4 | 3 |
| 8:00 | 1 | 1 1/4 | 2 | 2 1/2 | 3 1/3 |
| 9:00 | ---- | 1 3/8 | 2 1/4 | 2 3/4 | 3 2/3 |
| 10:00 | 1 1/4 | ---- | 2 1/2 | 3 | 4 |
| 11:00 | ---- | 1 1/2 | 2 5/8 | 3 1/4 | 4 1/4 |
| 12:00 | 1 3/8 | 1 5/8 | 2 3/4 | 3 1/3 | 4 1/2 |
| 13:00 | 1 5/8 | 1 7/8 | 2 7/8 | 3 3/4 | 4 3/4 |
| 14:00 | 1 3/4 | 2 | 3 | 4 | 5 |
| 15:00 | 1 7/8 | 2 1/8 | 3 1/8 | 4 1/4 | 5 1/2 |
| 16:00 | 2 | 2 1/4 | 3 1/4 | 4 1/2 | 6 |
| 17:00 | 2 1/8 | 2 3/8 | 3 3/8 | 4 3/4 | 6 1/2 |
| 18:00 | 2 1/4 | 2 5/8 | 3 5/8 | 5 | 7 |
| 19:00 | 2 3/8 | 2 3/4 | 3 3/4 | 5 1/3 | 7 1/2 |
| 20:00 | 2 1/3 | 2 7/8 | 3 7/8 | 5 2/3 | 3 |
| 22:30 | 3 | 3 1/8 | 4 1/2 | 6 5/8 | 9 |
| 25:00 | 3 1/4 | 3 3/4 | 5 | 7 1/2 | 10 |
| 27:30 | 3 1/2 | 4 1/3 | 5 3/4 | 8 1/2 | 11 1/2 |
| 30:00 | 3 3/4 | 5 | 6 1/2 | 9 1/2 | 12 1/2 |
| 35:00 | 4 3/4 | 6 | 8 | 11 | 14 1/2 |
| 40:00 | 5 3/4 | 7 1/4 | 9 1/2 | 13 | 17 |
| 45:00 | 6 3/4 | 8 1/2 | 11 | 15 | 19 1/2 |
| 50:00 | 7 3/4 | 9 3/4 | 12 1/2 | 17 | 22 1/2 |
| 55:00 | 8 3/4 | 11 | 14 | 19 | 25 |
| 60:00 | 9 3/4 | 22 1/2 | 16 | 22 | 28 |

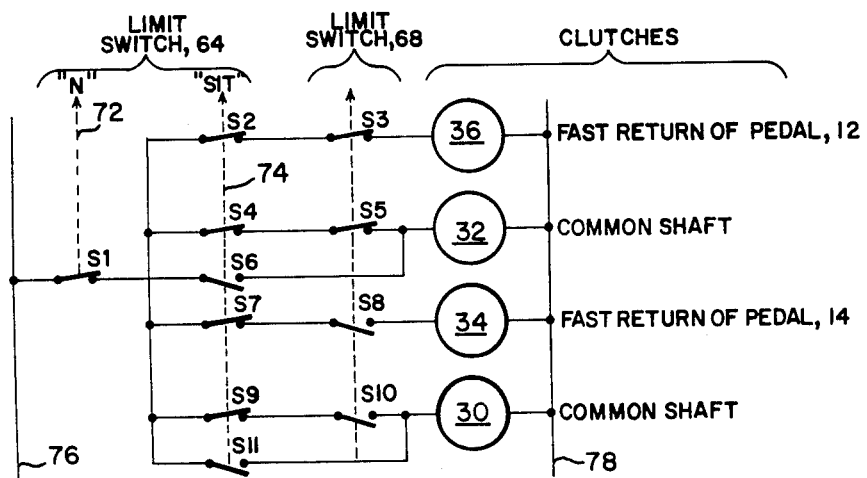
Fig. 6
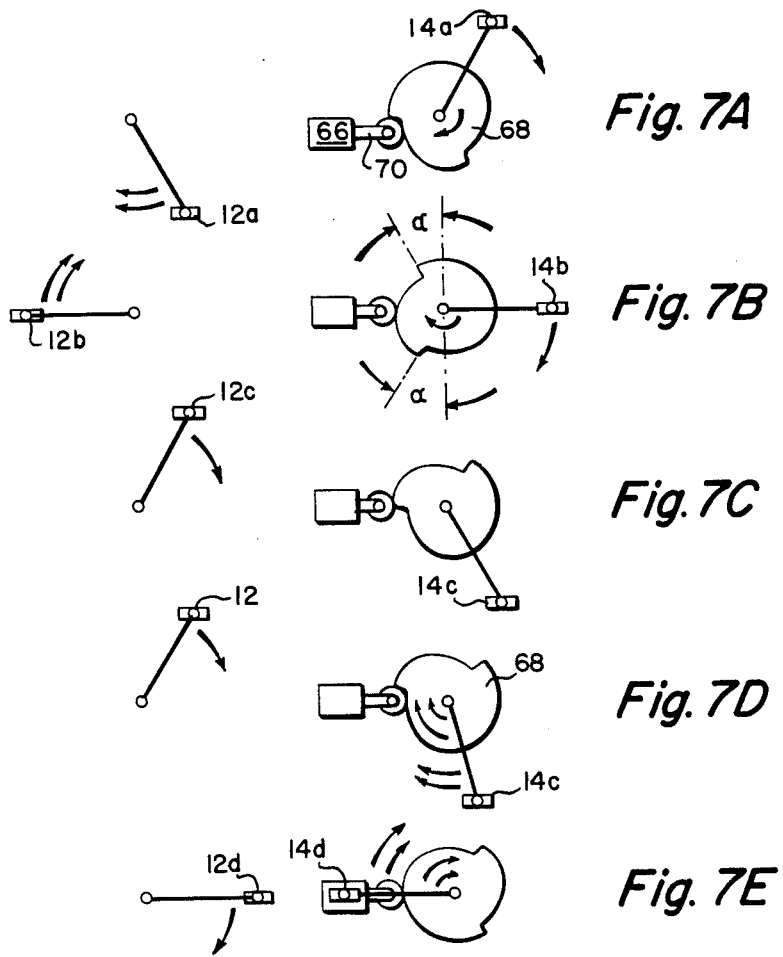
Fig. 7A
Fig. 7B
Fig. 7C
Fig. 7D
Fig. 7E

BIMODAL EXERCISE DEVICE

FIELD OF INVENTION

This invention relates to exercise devices and more particularly to exercise devices that simulate the exercise encountered while bicycling up hill in a stand-up position in addition to simulating the exercise encountered in normal, sit-down bicycling.

BACKGROUND OF THE INVENTION

Exercise, at least at some level, can reduce chances of sustaining a heart attack by up to 60%, and dying as a result of a heart attack by up to 70%. These statistics are found in the Paffenberg report, American Journal of Epidemiology, vol. 108, pps. 161–175, 1978. The above benefits accrue in approximately linear fashion up to a maximum weekly calorie burn of 2500. Using data for stationary cycling from a book entitled AEROBICS WAY by Dr. Kenneth H. Cooper, Bantam Books, New York, 1981, a rough calculation shows that a competitive cyclist, one who can spin his legs at 105 rpm for an hour, would burn 2500 calories with five one-hour sessions of stationary cycling at that speed. The average person using a stationary exercise bicycle would have to exercise considerably longer than five hours per week or he would have to be satisfied with significantly reduced benefit.

When the objective of exercise is minimizing occurrences and fatalities associated with heart attack, exercise takes on added proportions. The most common exercise device, the exercise bicycle, requires an extensive amount of time from the user in order to deliver significant benefit. Thus, a strong need exists for an exercise bicycle that can offer an additional mode of use which gives more exercise benefit per unit of time.

It is worth noting that in quantifying exercise intensity levels for stationary cycling, in the above-mentioned book Dr. Cooper states that stationary cycling is awarded approximately half the points as regular cycling. This difference in exercise intensity offered by rolling bicycles compared to stationary bikes is a result of the advantage that the rolling bicycle derives from its rolling momentum which assists the user in moving his feet through top/bottom dead center. Helping the stationary bike to equal the rolling bike in exercise intensity by giving the stationary bike an action through pedal top/bottom dead center similar to that of the rolling bicycle is a significant benefit since higher sit-down exercise intensities can be obtained.

Moreover, the results of the research of physiologists Astrand and Saltin indicate why body lifting, e.g. stand-up hill pedalling, offers significantly more exercise benefit than sit-down pedalling. Astrand and Saltin discovered that the length of time an exerciser can continue at high intensity is proportional to the mass of muscle used. Stand-up, body lift pedalling uses a larger muscle mass than sit-down leg spinning. Therefore, stand-up, body lift pedalling gives opportunity for longer exercise than sit-down pedalling. Thus, any device that facilitates stand-up, body lift pedalling and offers the user help over the top/bottom dead center positions, increases the time the user can exercise at high intensity and consequently increases the intensity an exerciser can maintain for any given period of time. Thus, if in addition to making a stationary bicycle behave like a rolling bike in relation to force required to move the pedals through top/bottom dead center, a simulation of the "stand-up", hill climbing mode of bicycling were added to the conventional exercise bicycle, a longer duration of exercise at high intensity would be possible.

Present technology exists that teaches the attainment of a stand-up, body lift mode of exercise through various climbing simulators such as illustrated in U.S. Pat. Nos. 1,409,992; 1,820,372; 1,854,473; 3,227,447; 3,381,958; 3,395,698; 3,497,215; 3,511,500; 3,529,474; 3,704,886; 3,758,112; and 3,865,366. Note that the device described in U.S. Pat. No. 3,360,263 involves an eccentric brake drum which helps reduce top/bottom dead center problems associated with normal, sit-down exercise bicycles. Other U.S. patents dealing with exercise bicycles and control systems include U.S. Pat. Nos. 359,800; 3,419,732; 3,501,142; 3,518,985; 3,744,480; 3,767,195; 3,802,698; 3,845,756; 3,848,467; 4,112,928; and 4,244,021. However, nowhere in these references is taught how exercise bicycle design can be modified to offer two modes of exercise, with one including the desirable body lift exercise where comfortable high intensity levels can be maintained for long periods of time through a stand-up pedalling action during which the user expends energy by cyclically raising his body. It should be noted that the technique for stand-up pedalling for hill climbing is called "honking" and is a natural body response to pedalling a one speed bike up an incline.

Exercise bicycles that offer high intensity, body lift exercise as an additional mode of use are desirable because stationary bicycles are the type of machine most often associated with exercise in the minds of potential users. It should also be noted that the present low intensity, sit-down, leg churn exercise bicycles are relatively ineffective because of the low intensity and the short duration exercise afforded when the user stops due to leg fatigue.

SUMMARY OF THE INVENTION

On first impression, it would seem that all one would have to do in order to use the conventional stationary exercise bicycle in a stand-up, body lift mode of exercise, would be to tighten up the brake and pedal in a stand-up position. This approach is not effective because the increased braking removes the momentum needed to carry the user's feet through top/bottom dead center of the rotation. It is possible to pedal standing up with braking reduced so that momentum is provided to move the user's feet through top/bottom dead center. However, the result is that the unbraked pedals move so fast no body lift occurs. In this instance, the user's body and center of gravity stay fixed and the legs churn with the same result as sit-down pedalling.

Therefore, in the subject invention, relatively heavy braking is maintained to provide increased exercise intensity and to provide a platform for the step up from the "down" pedal to the "up" pedal. Since the heavier braking essentially eliminates momentum as an assist through top and bottom dead center, a different system is used for moving the user's feet through, and sufficiently beyond, top/bottom dead center. In this invention, the fixed 180° relationship of the pedals used in the normal sit-down mode is made adjustable so that a relationship that beneficially varies the pedals one to another during the pedalling cycle is selectively obtained.

Two systems of varying pedal relationship are used to facilitate the switch from normal sit-down exercising to stand-up exercising. The first system returns the "down" pedal to the "up" position by fast return gearing which swings the "down" pedal rapidly around through bottom and past top dead center, with the "down" pedal powered by the "up" pedal while the "up" pedal moves through the power portion of the pedalling cycle under the weight of the user. The power portion of the pedalling cycle, called the power stroke, is nominally 30° after top dead center through to 30° before bottom dead center. In this system, just after the power stroke, the returning "down" pedal is virtually locked against reverse movement by the fast return gearing system to provide a step-up platform so that the user can raise his body. The second system avoids taking the pedals through top/bottom dead center by restricting the movement of both pedals to the power portion of the cycle. In this system, the "down" pedal reverses its direction and retraces its path to return to the "up" position while the "up" pedal moves through the power portion of the stroke under the weight of the user. Stops are provided for each pedal at the bottom of the power stroke to provide a step-up platform for body lifting.

In either system, if the pedalling rate is so fast that it does not provide opportunity for body lift to occur, the limiting of pedal movement insures a platform for step-up without which body lifting would not be possible, and without which the benefits therefrom would not be achieved.

In order to offer the user choice of either sit-down or stand-up cycling, switching between modes is made easy such that the bimodality provided does not penalize use in either mode. In addition to offering a user an exercise bicycle that can be used conveniently in either of the two modes mentioned, a slight adjustment of seat position offers a third in-between mode of exercise which corresponds to a medium intensity, modified sit-down pedalling.

One embodiment of the first system of adjustable pedal relationship includes a gearing system that phases the pedals and moves each pedal through 240° while the other pedal moves through 120°. It also includes a series of electrically controlled clutches that accommodate switching from normal to stand-up mode of use. The system also includes a switch to sense shaft position which is used to phase the pedalling segments to the user foot position.

One embodiment of the second system of adjustable pedal relationship is a mechanical device having pedal cranks attached to a common axis by ratchets. The pawls of these ratchets are locked when using the device in the normal fixed 180° pedal relationship. The pawls are made free to ratchet when the stand-up pedalling mode is desired. The device also includes springs to return the "down" pedal to the "up" position and adjustable stops are provided to cushion and limit pedal motion to the end of the stroke.

In summary, the subject invention offers the user both the fun associated with exercise that simulates bicycling and the benefits associated with comfortable high intensity exercise.

BRIEF DESCRIPTION OF THE DRAWINGS

These and other features of the subject invention will be better understood in connection with the detailed description taken in conjunction with the drawings of which:

FIG. 6 is a schematic diagram of a control circuit for use in the apparatus of FIG. 4;

FIGS. 7A-7E are a series of diagrams illustrating the action of a position switch relative to pedal position and cam position;

DETAILED DESCRIPTION

Figures 1, 2:
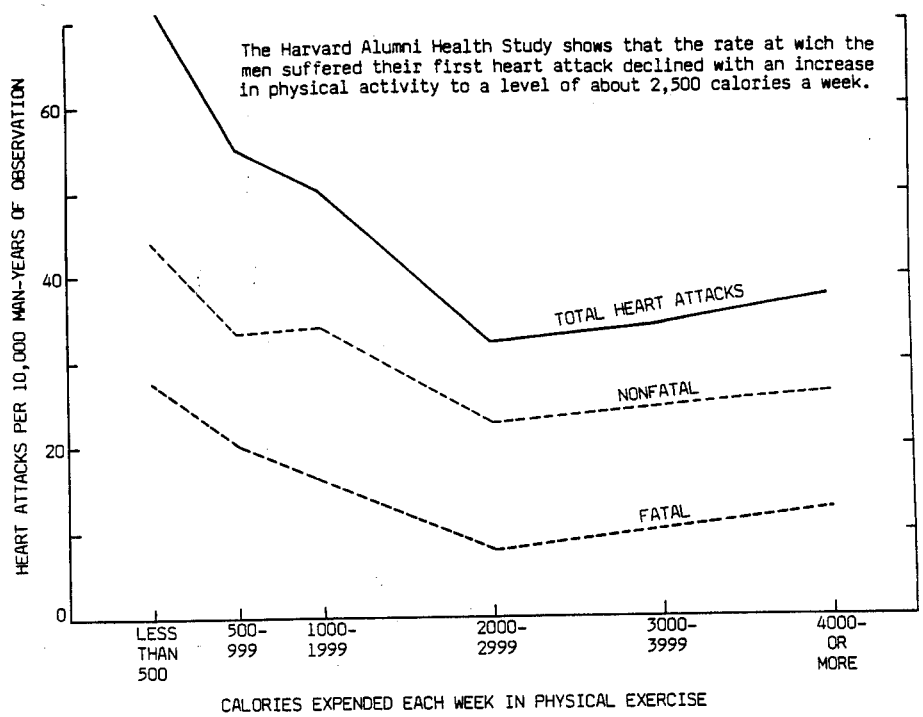
FIG. 1 is a graph relating rate of heart attack incidence to quantity of exercise obtained weekly.
FIG. 2 is a chart relating quantity of exercise obtained from use of an exercise bicycle to the time spent and pedalling rate maintained.

Apparatus that simulates the exercise obtained in two modes of bicycling, either the sit-down normal pedalling mode or the stand-up hill climbing mode, results in a quality of exercise which effectuates a reduced heart attack rate. Reduced heart attack rate through increasing exercise is illustrated in the graph of FIG. 1. FIG. 2 relates exercise on a stationary bicycle to numbers of Cooper points. From FIG. 1, it can be determined that the most benefit to an individual comes from the expenditure of 2500 calories per week. From FIG. 2, it can be ascertained that at 20 calories Cooper point, the maximum benefit would require 125 Cooper points per week for five, one hour sessions at the highest speed on the chart. It will of course be appreciated that this level of activity is impossible for most average users of the device. It can be shown that through the utilization of the subject device which assists the user to move the pedals through top and bottom dead center while at the same time affording the user the benefits of stand-up, body lift exercise, the amount of time that the user expends in exercise can be dramatically reduced while at the same time providing the user of the device with as many as 2500 calories per week in exercise.

Fast Return Gearing System

Figure 3A:
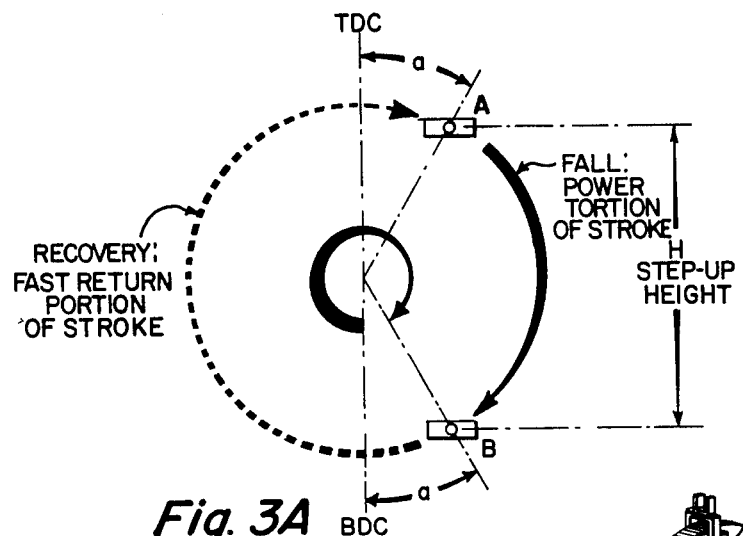
FIG. 3A is a diagram of the controlled pedal relationship technique that moves one pedal through both top and bottom dead center while the other pedal moves through the power portion of the pedalling cycle.

Referring now to FIG. 3A, a diagram is provided which illustrates one embodiment of the subject invention in which the unweighted pedal is helped through the top and bottom dead center positions by virtue of the weight of the individual on the pedal going through the power stroke. This schematic diagram illustrates how a rhythmic stand-up pedalling regime can be undertaken under heavy braking by creating a pedal-to-pedal relationship that moves the "down" pedal from point B, around through the return portion of the cycle to point A, while the "up-pedal" moves from point A through the power portion of the cycle to point B. The angle $\alpha$ defining the power stroke, in a preferred embodiment, is 30°, with the step-up height being determined by relative positions of the pedals at points A and B.

Figure 3B:
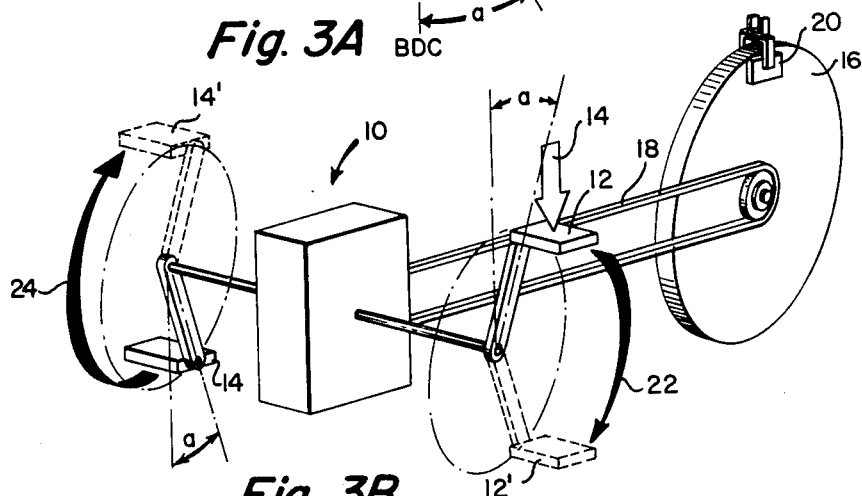
FIG. 3B is a diagrammatic illustration of a bimodal exercise device which permits the non-symmetrical relative motion of the two pedals that avoids the unfavorable situation of both pedals going through dead center at the same time.

Referring now to FIG. 3B, a clutch phasing mechanism, generally illustrated at 10, phases pedals 12 and 14 with respect to each other such that the downward movement of pedal 12 as indicated by arrow 13 to a position 12' during a power stroke, both drives wheel 16, while at the same time driving pedal 14 from the position illustrated, past bottom dead center and around through top dead center to the point illustrated at 14'. In so doing, the movement of pedal 12 as illustrated by arrow 22, results in the rotation of wheel 16 and also in the movement of pedal 14 as illustrated by arrow 24. Note that pedal 12 drives wheel 16 via chain 18 with the wheel being braked by pads 20, and that a seat 21 is provided affixed to a portion 23 of the device frame (not shown).

Figure 4:
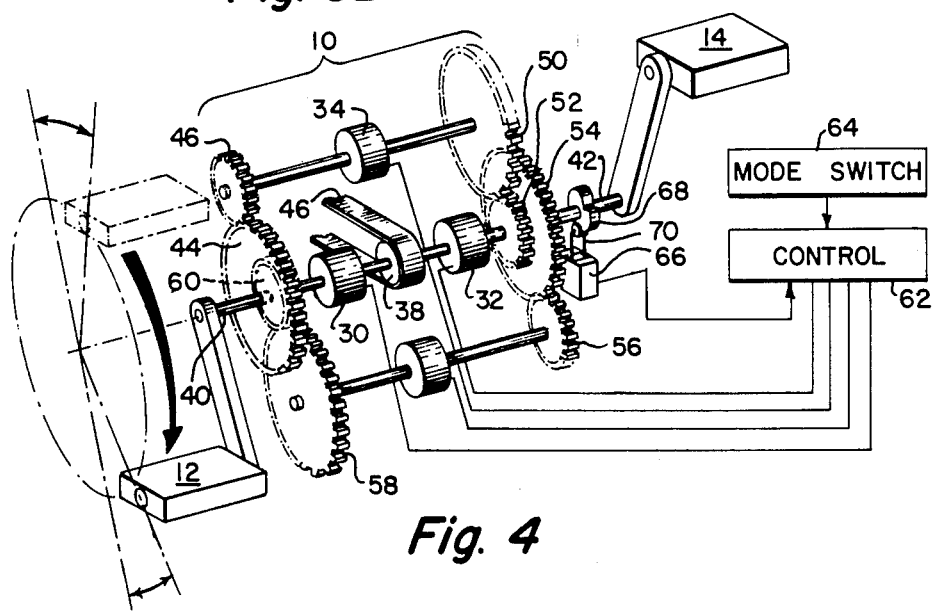
FIG. 4 is a diagrammatic illustration of a gear and clutch mechanism as an embodiment of the technique described in FIGS. 3A and 3B.

Referring now to FIG. 4, phasing device 10 for pedals 12 and 14 of FIG. 3B includes four electromagnetic clutches 30, 32, 34, and 36, with clutches 30 and 32 serving to connect a common shaft 38 to pedals 12 and 14 respectively through shafts 40 and 42. All of the shafts lie along a common axis about which the pedals revolve. Common shaft 38 is provided with a pulley 39 around which a linkage in the form of a strap 46 is wrapped.

Fast return gearing for pedal 14, the left pedal, includes gears 44, 46, 50, and 52 with clutch 34 engaged. Gears 44 and 50 are large diameter gears, whereas gears 46 and 52 are small diameter gears.

Fast return gearing for pedal 12 is accomplished by gears 54, 56, 58, and gear 60 shown in dotted outline, with fast return for this pedal being accomplished through the actuation of clutch 36. Gears 54 and 58 are large diameter gears, whereas gears 56 and 60 are small diameter gears.

The fast return is provided by the step-down of the diameters of the gears starting with the first large gear associated with the pedals at the beginning of the power stroke, with the ratio of large gear diameter to small gear diameter being $(180° + 2\alpha)/(180° - 2\alpha)$.

Each of the electromagnetic clutches is controlled by a control unit 62 under the control of a mode switch 64, with control unit 62 being provided as part of a limit switch 66 operated in accordance with the position of a cam 68 which is attached to shaft 42 as will be described.

When mode switch 64 is switched to a neutral position, all clutches are disengaged and the pedals 12 and 14 may be positioned 180° apart. When the mode switch 64 is switched to the normal sit-down exercise mode, clutches 30 and 32 are engaged whereas clutches 34 and 36 are disengaged. In this mode of operation, shafts 40 and 42 are locked to common shaft 38.

Figure 5:
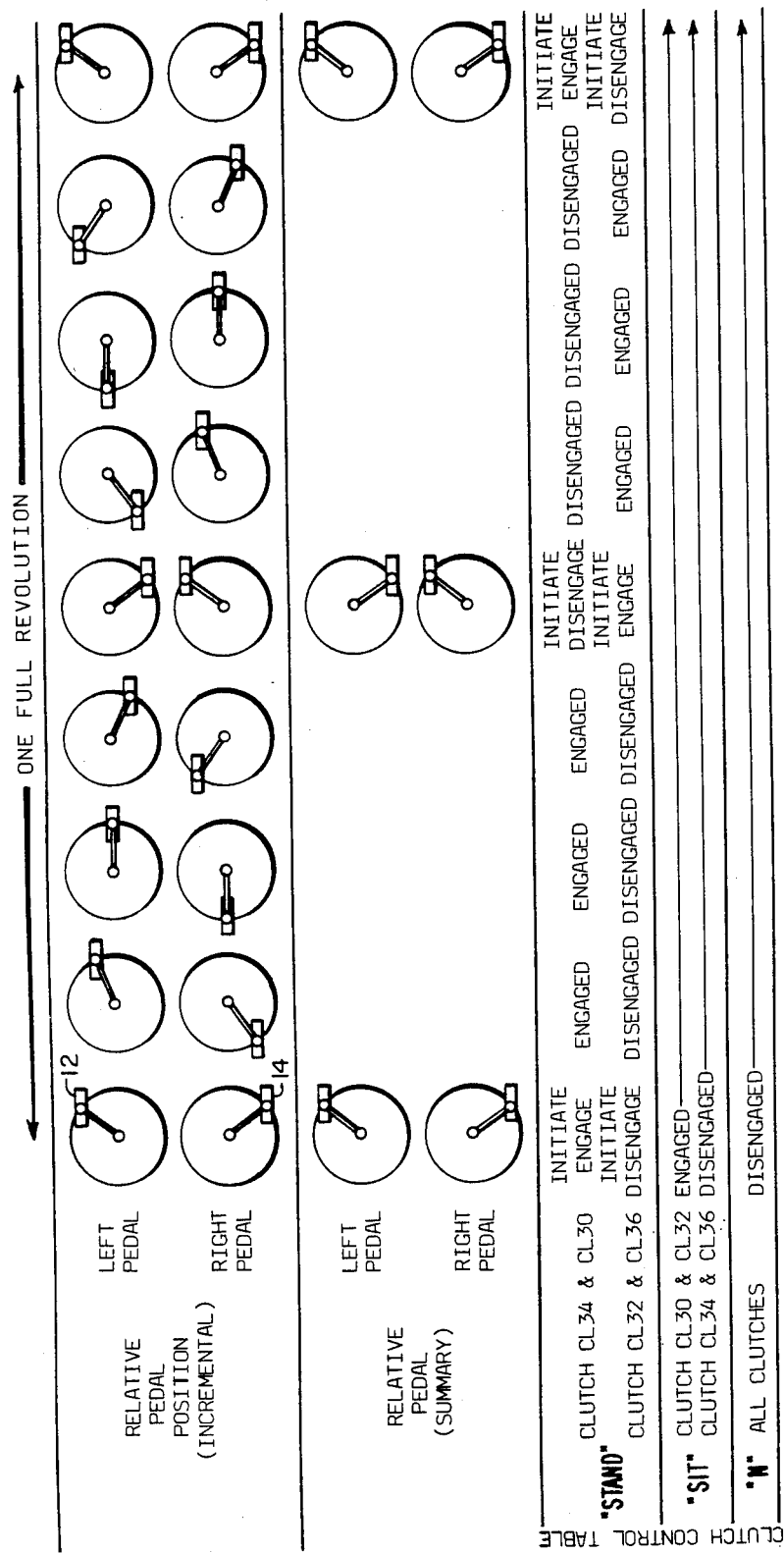
FIG. 5 is a diagram showing the relative position of the pedals throughout the pedalling cycle for stand-up use, also describing the clutch activity needed to effect the desired shift in pedal travel rate at the points of transition between the power application portion of the cycle and the fast recovery portion.

When the mode switch is switched to the stand-up mode, the clutches are engaged and disengaged in accordance with control 62 and in relationship to the position of cam 68 such that during the power stroke of pedal 14, clutch 32 is engaged and clutch 30 is disengaged, whereas clutch 36 is engaged to return pedal 12 through the return stroke while at the same time clutch 34 is disengaged. During the power stroke of pedal 12, clutch 30 is engaged, clutch 32 is disengaged, clutch 34 is engaged, and clutch 36 is disengaged. The result of this actuation can be seen in the diagram of FIG. 5 in which the phasing of the pedals is indicated along with the engagement or disengagement of the indicated clutches.

In summary, with pedals 180° apart and with clutches 30 and 32 disengaged, the pedals are locked to the common shaft 38 and the apparatus operates at a normal exercise bicycle. In order to pedal standing up, the apparatus is adjusted so that the braking is increased to absorb the additional energy expended and to slow the fall of the pedal carrying the exerciser's weight. If the normal 180° pedal relationship is maintained with the increased braking, the pedals would not coast through top and bottom dead center. Therefore, the gearing is made operative so that the non-weight-bearing pedal is forced through the top and bottom dead centers by the action of the weight-bearing pedal.

All the gearing mentioned above is involved with moving the "down pedal" through the unproductive return portion of the cycle. As such, it is designated "fast return gearing". There is a set of fast return gears for moving the left pedal through the return portion of its cycle rapidly and a matching set for the right pedal. The ratio of the larger gears to the smaller gear diameters is governed by the selection of the point in the cycle where the step-up is considered complete, and the fall of the up pedal under the user's weight begins. This step-up point is described in angular terms as $\alpha$ in FIGS. 3A and 3B.

As described above, the weight-bearing pedal is connected to the common shaft and consequently to the braking mechanism during its movement from point A to point B of FIG. 3A. At point B, the associated pedal is disconnected from the shaft and is connected to the fast return gearing. This connection to the fast return gearing makes this pedal almost immovable under the weight of the user and therefore provides a stable platform for the step-up transfer of the user's weight to the other pedal. The fast return gearing is disconnected from the pedal when it reaches point A of FIG. 3A and simultaneously the pedal is reattached to the common shaft. Note that because of the symmetrical gearing, when one pedal is at point A of FIG. 3A, the other pedal is at point B of FIG. 3A. In the embodiment described in FIG. 4, the clutches are electric and their actuation is controlled by cam-operated limit switch 66. The limit switch has two normally open circuits and two normally closed circuits that reverse condition each time the switch's cam following plunger 70 drops over the lobes of rotating cam 68.

Referring now to FIG. 6, a control circuit including mode control switch 64, control unit 62, and limit switch 66, shows the connection of the limit switch contacts, S3, S5, S8, and S10 to the appropriate clutches to produce a simultaneous release from the common shaft and attachement to gearing at point B, and release from gearing and attachment to the common shaft at point A. Also shown in this figure is the operation of mode switch 64 in which movement of the mode switch to the neutral position results in the opening of switch S1 as indicated by arrow 72. Switches S2, S4, S6, S7, S9, and S11 are shown in positions for the stand-up mode and are switched by mode switch 64 in the direction indicated by arrow 74 for the sit-down mode. As can be seen, in the sit-down mode, power is applied to common shaft clutches 30 and 32 when they are connected across lines 76 and 78, by virtue of current passing through switches S1, S6, and S11. In the stand-up mode, switchs S6 and S11 are opened and power is applied from line 76 to fast return clutches 34 and 36 via switches S2 and S3 in one case, and switches S7 and S8 in the other case. Limit switch 66 opens and closes switches S3, S5, S8, and S10 such that, as illustrated, in one-half of the cycle switches S3 and S5 are closed whereas switches S8 and S10 are open. This provides for the return of pedal 12. When the limit switch is actuated in the other direction, switches S3 and S5 are opened and switches S8 and S10 are closed, thereby causing the return of pedal 14.

Referring now to FIGS. 7A–7E, one configuration of cam 68 is shown, as well as its fixed relationship to pedal 14. Pedal 14 is illustrated in the positions noted by 14a–14d, with the cam being rotated with pedal 14 so as to actuate limit switch 66. To the left of this diagram pedal 12 is illustrated in positions 12a–12d. The fast return is indicated by the double arrows, with the power stroke being indicated in all cases by a single arrow. It should be noted that as pedal 14a is brought down through the power stroke, cam 68 provides that cam follower 70 remains in an initial state such that switches S3 and S5 of FIG. 6 are closed, thereby engaging clutches 36 and 30 for the fast return of pedal 12. At this time, pedal 14 is connected to common shaft 38. This initial condition of limit switch 66 continues as illustrated in 7B in which pedal 14 is moved to position 14b and pedal 12 is moved quickly to the position illustrated at 12b. In FIG. 7C, pedal 14 reaches the position of 14c and pedal 12 reaches the position of 12c, just after which limit switch 66 extends to open switches S3 and S5 of FIG. 6 and to close switches S8 and S10 of FIG. 6. Thereafter, as illustrated in FIG. 7D, pedal 12 moves from the position of 12c downwardly, whereas pedal 14 moves rapidly upwardly from the position of 14c. Note also the rapid movement of cam 68 as illustrated in FIG. 7D. Midway in the cycle, as illustrated in FIG. 7E, pedal 14 reaches the point illustrated at 14d, whereas pedal 12 is now halfway through its power stroke and is as illustrated at 12d.

It will be appreciated that limit switch 66, once falling off a cam 68 lobe, latches into its state until such time as the cam permits cam follower 70 to extend again. When this occurs, switch 66 changes state thereby changing the positions of switches S3, S5, S8, and S10. It will be appreciated that such a switch is available from Square D Corporation as Class 9007 C 54B2.

In summary, the limit switch has two normally open circuits and two normally closed circuits that reverse condition each time the switch's cam follower is permitted to extend by the cam.

Note with respect to FIG. 7 that the diagrams therein show the switching action at the desired pedal positions. In a preferred embodiment, a cam having actuating lobes based $180° - 2\alpha$ apart is affixed to either pedal at its center of rotation. Limit switch 66 is positioned so that the first cam lobe causes actuation when the pedal is approximately $\alpha°$ beyond top dead center. With simultaneous switching between gearing and shaft for both pedals, the two-lobe, shaft-attached cam assures that the transition between power and fast return cycle segments occurs at the same point in the pedal rotation throughout use regardless of accuracy of set up.

When the subject device is used as a conventional sit-down exercise bicycle, mode switch 64 is set in the "sit" position with the pedals 180° apart. When shifting to the higher intensity stand-up mode of pedalling, the user sets the mode switch to the neutral position which frees both pedals from both the shaft and the fast return gearing. The user then positions the cam bearing pedal at point A as indicated by the feel and sound of the limit switch actuation. The non-cam bearing pedal is Placed at a position approximating point B and the mode switch is set to "stand". The operation of the mode switch in relation to the clutch control that allows free pedal movement for positioning during the shift between "sit" and "stand" modes of use is described in connection with FIG. 6. The diagram of FIG. 6 also describes how the "sit" position of the mode switch activates the common shaft clutches so that the pedals are rigidly attached to the common shaft and fast return clutches are deactivated. The diagram of FIG. 6 further shows how positioning the mode switch in the "stand" position links the common shaft clutch of one pedal with the fast return clutch of the other pedal so that they can be cycled as pairs by the cam-operated limit switch.

When used in the "sit" mode, determining and controlling the user's exercise intensity can be set by selecting a brake load and then monitoring and matching a predetermined pedalling rate. However when used in the "stand" mode, determining and controlling the user's exercise intensity is made much simpler. The user's exercise intensity is a function of his body weight, how high the user lifts his body weight each time he steps up from the "down" pedal to the "up" pedal, and how many times per minute he performs this step-up. Since body weight and step-up height are essentially constant during the exercise period and are usually convertable into foot pounds, determining and controlling intensity merely involves step-up rate.

Maximum step-up rate is controlled by the time it takes the weight-bearing pedal to fall from point A to point B. In this embodiment, fall time is set by adjustment of the braking mechanism. With fall time set to yield a desired step-up rate, maximum exercise intensity is easily determined numerically. It is also easy for the person performing the exercise to control his activity to fill his exercise regimen. As will be apparent, all the individual has to do is to step up every time the pedal which is bearing his weight hits bottom and is coupled to the fast return gearing. The individual does not have to worry about matching his pedal rate to an indicator. Rather, all the individual does is go as fast as the machine allows him.

Ratchet System

The second system for variable pedal relationship is one that in the "stand" mode avoids taking the pedals through top or bottom dead center. This is shown schematically in FIGS. 8A and 8B. As will be seen, in the "stand" mode, each pedal swings back and forward through an arc between point A and point B, which are located at angular displacements $\alpha$ as illustrated. The power stroke is illustrated by arrow 80 whereas the return stroke is illustrated by dotted arrow 82. Note the step-up height H is indicated between points A and B.

Figure 8B:
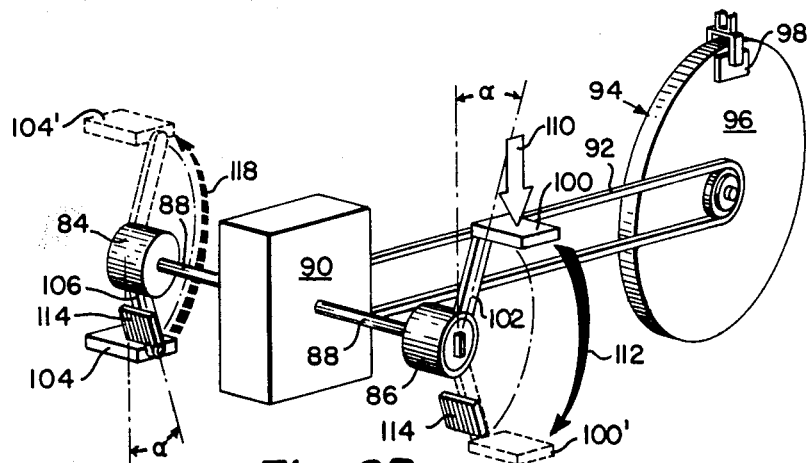
FIG. 8B is a diagrammatic illustration of a bimodal exercise device that in one mode avoids the pedals going through dead center at the same time by confining pedal motion to the power portion of the pedalling cycle.

Referring to FIG. 8B, pedal ratcheting mechanisms 84 and 86 are coupled via a common shaft 88 to a drive 90 which drives a linkage 92 that in turn drives a braking mechanism, generally indicated at 94, which may include a wheel 96 and brake pads 98. An "up" pedal 100 is attached by crank 102 to ratcheting mechanism 86, whereas "down" pedal 104 is attached by a crank 106 to ratcheting mechanism 84. Note, a seat 107 is affixed to a portion 109 of a frame (not shown in this figure).

In operation, as indicated by arrow 110, "up" pedal 100 is depressed downwardly in the power stroke indicated by arrow 112 until this pedal reaches a position 100' against a stop 114. During this time, pedal 104 is unweighted and is spring-returned to position 104' as illustrated by arrow 118 by virtue of a spring return within ratcheting mechanism 84.

As will be described, the provision of a conventional exercise bicycle with ratcheting mechanisms 84 and 86 at either end of the common shaft usually provided converts the traditional exercycle into one which can be switched to a "stand" mode by the most simple of adaptations.

Figure 9:
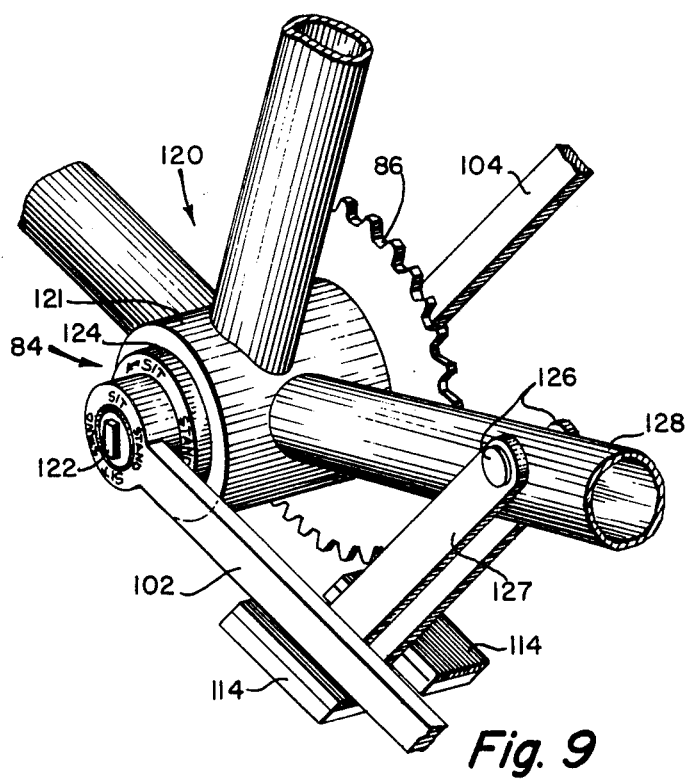
FIG. 9 is a diagrammatic illustration of a ratcheted crank arm mechanism for use in the apparatus of FIG. 8B.

Referring to FIG. 9, a bicycle frame 120 is provided with a housing 121 at either end of which are located ratcheting mechanisms 84 and 86, each provided with a switch handle 122 which can be set to either a "sit" or "stand" mode. The ratcheting mechanism is also provided with a collar 124 which serves to either engage or disengage a spring return mechanism.

Figure 12:
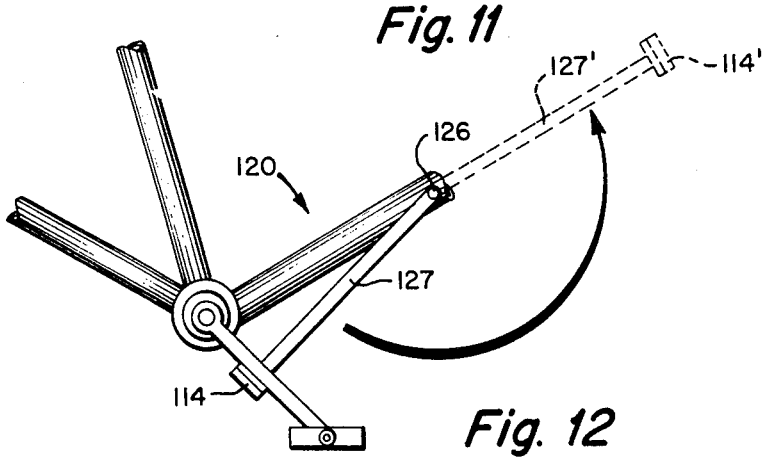

As shown in FIGS. 9 and 12, stop 114 is pivotedly hinged at 126 via a bar 127 to a portion 128 of frame 120 so that it can be moved out of the way as illustrated at 114' for normal sit-down pedalling.

Figure 10:
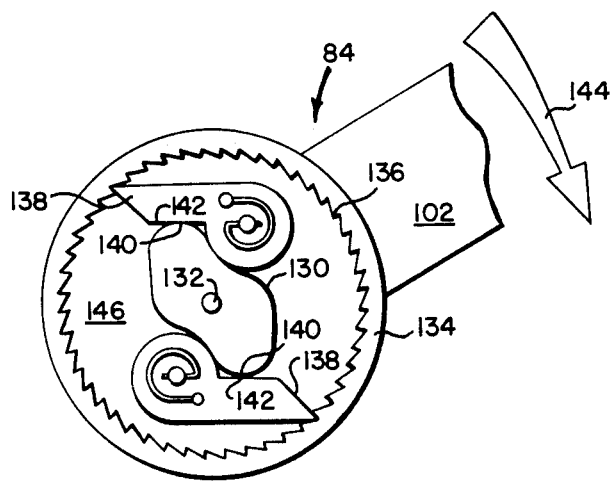
FIG. 10 is a side view of a ratchet for use in the apparatus of FIG. 9 illustrating the pawl-locking cam that facilitates change between "sit" and "stand" modes of use.

Referring to FIG. 10, one of the ratcheting mechanisms is shown, in this case ratcheting mechanism 84. Handle 122 of FIG. 9 controls the position of a cam 130 mounted for rotation about a shaft 132 in a housing 134 which carries teeth 136 about the interior wall of the housing. Spring-loaded pawls 138 are mounted to either side of cam 130 such that the ends thereof are locked to teeth 136 when cam 130 is in the position shown such that surfaces 140 of cam 130 bear upon surfaces 142 of pawls 138. When cam 130 is rotated 90°, the pawls are unlocked and the ends of the pawls are biased for ratcheting into the teeth by springs 143.

As illustrated, housing 134 is cylindrical. Crank 102 is fixedly attached to housing 134 such that crank 102, when driven in the direction of arrow 144 drives a plate 146 to which pawls 138 are attached. This can be seen more clearly in FIG. 11 in which like reference characters are utilized to denote like elements as between FIGS. 10 and 11.

Figure 11:
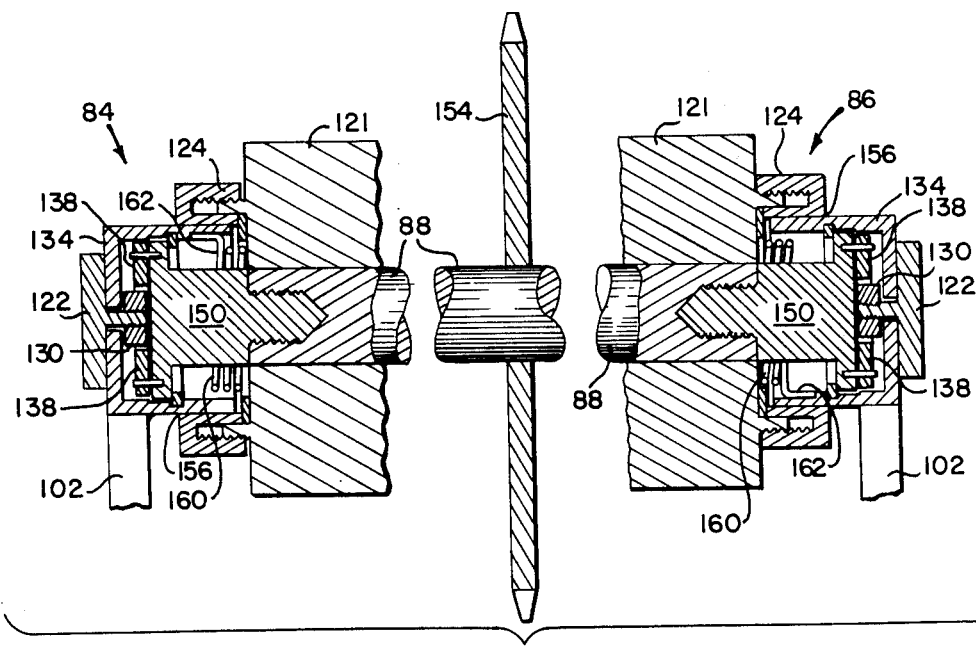
FIG. 11 is a cross-sectional illustration of the ratchet and cam drive for use in the apparatus of FIGS. 8B and 9 showing a return spring and locking mechanism that facilitates change between "sit" and "stand" modes of use; and, FIG. 12 shows a retractable end of stroke stop cushion used in the embodiment of FIGS. 8B and 9 to facilitate change between "sit" and "stand" use.

As can be seen from FIG. 11, plate 146 forms the head of a shaft 150 which is connected to common shaft 88 in any conventional manner. Shaft 88 is positioned within housing 121 and is connected to a sprocket wheel 154 which is utilized to drive wheel 96 of FIG. 8B in combination with a chain (not shown) forming linkage 92.

Housing 134 is accommodated in an aperture 156 in collar 124 which carries an annular threaded channel 145 and which is screwed onto a threaded cylindrical portion 147 carried by housing 121 to limit the rotation of an internally carried helical spring 160 having one end 162 secured to housing 134. The other end 163 of the spring is secured to a ring 164 sandwiched between the bottom 166 of the collar and housing 121. When collar 124 is tightened, the ring is clamped to housing 121 which is part of frame 120. This anchors end 163 of spring 160 to the housing through the binding of ring 164 against housing 121 when collar 124 is screwed tight. This is the return spring for the ratcheting mechanism, and is locked into place by collar 124 during the "stand" mode of operation. It will be appreciated that ratcheting mechanisms 84 and 86 are identical in construction, with line elements carrying like reference characters.

In normal sit-down use, the two cranks are fixed to the common shaft in a 180° relationship so that they revolve about a common axis. They are prevented from ratcheting by action of the cam when it is in the "sit" position. In the "sit" position, the two eccentric lobes of the cam lock the pawls into the valleys between the teeth, thus to prevent the movement of cranks 102 and 104 in relationship to the common shaft.

To shift from the sit-down to the stand-up mode of use, all the individual is to do is to set the cam to the "stand" position, bring the cranks to the desired step-up position, e.g. point A, lock the spring return into action by tightening collar 124, and swing the stop into the position 114' shown in FIG. 12. All that is then necessary is to tighten the braking mechanism. To use the subject apparatus in the stand-up mode after making the mode switch adjustment as described above, the user merely steps onto one pedal, letting it fall under his weight to the bottom of its stroke. During the fall, the ratchet action serves to grasp and move the common shaft, which is braked by the braking mechanism, so as to convert a major portion of the user's energy input into heat. When the fall of one pedal is complete, the user steps up onto the other pedal. When he transfers his weight from the down pedal to the up pedal, the down pedal is free to spring return upward about the common shaft. This action, while being similar to that described in aforementioned U.S Pat. No. 3,704,886, affords bimodal use with a simplified switching arrangement using ratchets.

Figure 8A:
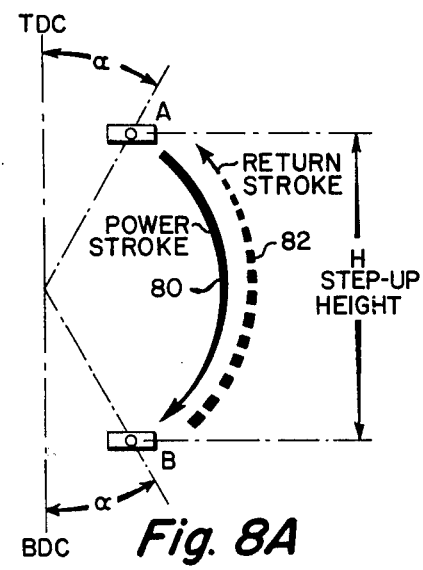
FIG. 8A is a diagram of an embodiment of the subject invention that accommodates bimodal exercise, and in the "stand-up" mode, restricts pedal action to the power portion of the pedalling cycle, preventing pedal passage through top or bottom dead center.

The level of exercise itensity attained is a function of the step-up height and the number of times per minute step-up occurs. Step-up height, "H" in FIG. 8A, is selected by how high above the stroke limiting stop the pedal is positioned when collar 124 is tightened during the mode switch adjustment. The maximum step-up rate is essentially controlled by fall time. In this embodiment, fall time is varied by adjustment of the braking mechanism.

To return to the sit-down mode of pedalling, the user simply loosens collar 124, ratchets one pedal into a 180° relationship with respect to the other, locks both ratchet cams by turning the handle to the appropriate setting, and swings the stop out of the way. The user may then wish to reduce the braking to a level appropriate for sit-down pedalling.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for effecting bimodal exercise approximating sit-down pedalling and stand-up pedalling of a bicycle comprising:

an exercise bicycle including a frame, a seat attached to said frame, a pair of pedals mounted to said frame for rotation about a common axis, braking means, and means coupled to said pedals for driving said braking means; said driving means including means for selectively phasing said pedals such that in one mode said pedals are effective to drive said braking means only during a predetermined power stroke in which the relationship between the pedals is other than 180° for a portion of the power stroke, the pedal bearing the power stroke pressure moving through an angle less than 180° during the power stroke, the other pedal moving through an angle greater than 180° during the power stroke, said pedals being returned to a position corresponding to the start of the power stroke when unweighted; and such that in a second mode said means for selectively phasing said pedals is effective for locking said pedals in a 180° relationship to drive said braking means.

2. The apparatus of claim 1 wherein said phasing means includes means for limiting the movement of the down pedal once it reaches the bottom of the power stroke, thereby to provide the down pedal as a step-up platform for body lifting of the user.

3. The apparatus of claim 2 wherein said limiting means includes fast return gearing for returning the down pedal to a predetermined up position, and means for selectively connecting said fast return gearing to said down pedal when said down pedal is at the bottom of its associated power stroke.

4. The apparatus of claim 2 wherein said selective phasing means includes ratchet means coupled between each of said pedals and said driving means for providing that reciprocating motion of said pedals only through the corresponding power stroke thereof drives said braking means, said ratchet means including spring return means for each pedal to return each pedal to a predetermined start position of the power stroke thereof when the associated pedal is unweighted, and wherein said limiting means includes stop means coacting with said pedals and positioned for limiting downward pedal travel.

5. The apparatus of claim 1 wherein said selective phasing means includes means for selectively coupling a pedal to said driving means during the power stroke thereof, fast return gear means, and means for selectively coupling said fast return gear means to said pedals such that one pedal is driven by the other pedal during the power stroke of said other pedal to return said one pedal to the start of said power stroke.

6. The apparatus of claim 5 wherein said fast return gear means includes fast return gearing associated with respective pedals and a pair of shafts each having two sections and each coupling fast return gearing associated with one pedal to fast return gearing associated with the other pedal, and wherein said selective coupling means includes a common shaft coupled to said braking means, first and second electrically-actuated clutch means coupled between an end of said common shaft and a corresponding pedal, third and fourth electrically-actuated clutch means coupled between respective shaft sections, and means for controlling said clutch means so as to disengage said third and fourth clutch means and so as to engage said first and second clutch means for locking said pedals in said 180° relationship.

7. The apparatus of claim 6 wherein said control means includes means for disengaging said first and second clutch means and for selectively engaging said third and fourth clutch means responsive to the position of one of said pedals such that the clutch means associated with a down pedal is actuated to connect said down pedal to said fast return gear means.

8. The apparatus of claim 7 wherein said means for selectively engaging said third and fourth clutch means includes a two-lobed cam, means for causing said cam to rotate with one of said pedals, and limit switch means positioned to be actuated by the lobes of said cam for selectively actuating third and fourth clutch means.

9. The apparatus of claim 8 wherein the start and stop positions of said power stroke are positioned an angle $\alpha$ after top dead center of said one pedal and an angle $\alpha$ before bottom dead center of said one pedal, and wherein said cam lobes are positioned $180° - 2\alpha$ apart.

10. The apparatus of claim 9 wherein $\alpha$ equals 30°.

11. The apparatus of claim 6 wherein said fast return gearing includes two sets of gears, each set having a diameter different from that of the other set so as to establish step-down gearing.

12. The apparatus of claim 11 wherein the ratio of the diameters of said sets of gears is $(180° + 2\alpha)/(180° - 2\alpha)$, where $\alpha$ is the angular position of the start of said power stroke from top dead center of the associated pedal.

13. The apparatus of claim 1 wherein said selective phasing means includes ratchet means coupled between each of said pedals and said driving means for providing that reciprocating motion of said pedals only through the corresponding power stroke thereof drives said braking means, said ratchet means including spring return means for each pedal to return each pedal to a predetermined start position of the power stroke thereof when the associated pedal is unweighted.

14. The apparatus of claim 13 wherein said ratchet means includes:

a cylindrical housing opened at one end and having a centrally apertured plate at the opposite end, said housing having ratchet teeth about the interior wall thereof, one of said pedals having a crank fixedly attached to said housing;

a shaft having a head disposed in said housing such that said head lies adjacent to said plate, one portion of said shaft being coupled to said braking means;

a pair of pawls mounted for rotation at opposite sides of said head such that the ends of said pawls coact with the teeth carried about the interior wall of said housing;

means for spring loading said pawls such that the ends of said pawls are biased against said teeth; and means for locking said pawls to said teeth.

15. The apparatus of claim 14 wherein said locking means includes a handle having a shaft extending through said plate aperture and a cam mounted at the end of said handle shaft such that when said cam is rotated by said handle, said cam contacts inner portions of said pawls to urge said pawl ends into locked engagement with said teeth.

16. The apparatus of claim 14 and further including:
a collar having an aperture adapted to receive said housing for rotation therein, said collar having a threaded annular channel, said frame having a corresponding threaded cylinder portion onto which said collar is adapted to be threaded;
a helical spring having one end attached to said housing; and
means including said collar for releasably clamping the other end of said spring to said frame when said collar is screwed down on said threaded cylindrical portion.

17. Apparatus for effecting bimodal exercise approximating sit-down pedalling and stand-up pedalling of a bicycle comprising:
an exercise bicycle including a frame, seat attached to said frame, a pair of pedals mounted to said frame for rotation about a common axis, braking means, and means coupled to said pedals for driving said braking means; said driving means including means for selectively phasing said pedals to alternatively effectuate a 180° relationship for sit-down pedalling and a predetermined relationship for stand-up pedalling in which the relationship between the pedals is other than 180° for stand-up pedalling during the power stroke such that the pedal bearing the power stroke pressure moves through an angle of less than 180° during the power stroke and such that the other pedal moves through an angle greater than 180° during the power stroke.

18. A bimodal exercise device comprising:
a stationary bicycle including a frame, a seat attached to said frame, a pair of pedals mounted to said frame for rotation about a common axis, braking means and means coupled to said pedals for driving said braking means, said driving means including means for selectively phasing said pedals in a 180° relationship for sit-down pedalling and for phasing said pedals to restrict the motion of said pedals to avoid top and bottom dead center positions for stand-up pedalling such that during a predetermined power stroke the relationship between the pedals is other than 180° for a portion of the power stroke, and such that the pedal bearing the power stroke pressure moves through an angle less than 180° during the power stroke, whereas the other pedal simultaneously moves through an angle greater than 180° during the power stroke.

19. The exercise device of claim 18 wherein said selective phasing means selectively restricts the motion of said pedals to a predetermined power stroke.

20. Apparatus for effecting exercise approximating stand-up pedalling of a bicycle comprising:
an exercise bicycle including a frame, a seat attached to said frame, a pair of pedals mounted to said frame for rotation about a common axis, braking means, and means coupled to said pedals for driving said braking means; said driving means including means for phasing said pedals such that said pedals are effective to drive said braking means only during a predetermined power stroke in which the relationship between the pedals is other than 180° for a portion of the power stroke, the pedal bearing the power stroke pressure moving through an angle less than 180° during the power stroke, the other pedal moving through an angle greater than 180° during the power stroke, said pedals being returned to a position corresponding to the start of the power stroke when unweighted.

* * * * *